July 27, 1937.  J. E. V. GRANØ  2,088,262
SPECTACLES FOR UNDER WATER USE
Filed Feb. 7, 1935
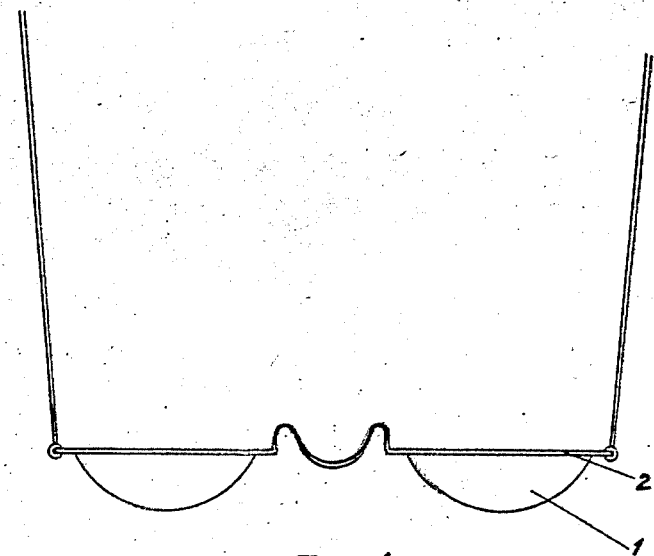
Fig. 1.
Fig. 2.
Fig. 3.
Fig. 4. — plano convex lens / plano parallel plate
Fig. 5.
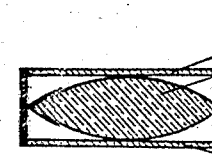
Fig. 6. — plane parallel plates / Double convex lens
Inventor:
Jens E. V. Granö

Patented July 27, 1937

2,088,262

UNITED STATES PATENT OFFICE 2,088,262

SPECTACLES FOR UNDER WATER USE

Jens Einar Vang Grand, Rungsted, Denmark, assignor to Corning Glass Works, Corning, N. Y., a corporation of New York Application February 7, 1935, Serial No. 5,477
In Denmark February 12, 1934

5 Claims. (Cl. 88—54)

When swimming under water, diving, or the like, regardless of whether these operations are performed for the sake of enjoyment, for sport or for any other purposes, as for instance life saving purposes, it is often felt as a great disadvantage, that one is not able to discern the surroundings clearly and distinctly.

The present invention has for its object to provide spectacles the employment of which eliminates this inconvenience and which are of a simple and reliable construction and can, if desired, be fastened to the head in the same manner as usual spectacles without involving any necessity of isolating the eyes from the water. To this end the spectacles according to the invention comprise a lens system or lens systems with so small a focus when immersed in water that the human eye is thereby rendered able to accommodate in water. The lens system placed before each eye can suitably be in the form of a single lens.

The principle on which the invention is based can shortly be explained as follows:

As is well known, the action of the human eye is to refract the light beams passing into the same and thus to focus an image of the object viewed on the retina. In other words, the eye acts as a lens, the focus of which can, to a certain degree, be adjusted in accordance with the distance of the object, so that a sharp image of the object is focused on the retina, regardless how great this distance is.

When, however, the eye, is immersed in water, which has a considerably greater coefficient of refraction than air, the refracting action of the eye consequently is decreased to such a degree that the eye is no longer able to adjust itself, even on infinitely distant objects. The normal eye, in this case, actually acts as a very long-sighted eye. It is possible to remedy this long-sightedness by using spectacles with convex lenses. When designing these, however, it should be taken into account that the refraction of the lenses takes place between water and glass and not, as is usually the case with spectacles, between air and glass. The refracting action of the lenses is, therefore, reduced considerably, i. e. the focus is increased correspondingly. According to the invention, however, it has been proved that the long-sightedness of the eye in water can be remedied by using lenses of common glass, the eye, hereby, being able to adjust itself on distant as well as on near objects, but the lenses to be used for this purpose are to have a very small focus, viz. normally less than 10 centimetres and preferably about 4-6 centimetres when immersed in water.

From the above description it will be evident that it is an advantage to make the lenses of a material having the greatest possible coefficient of refraction. For the rest, the lens system placed before each eye may be made of a single lens or of a combination of such. In certain cases it may be an advantage to use several lenses of materials having different coefficients of refraction. In another embodiment of the invention lens systems are provided which comprise a refracting medium the coefficient of refraction of which is less than the coefficient of refraction of water.

Reference will now be had to the accompanying drawing in which

Fig. 1 is a plan view of a pair of spectacles according to the invention and

Figs. 2–6 are cross sections through various forms of lens systems which may be employed in spectacles according to the invention.

In Fig. 1 two plano-convex lenses 1 are secured to a suitable frame 2 to provide a pair of submarine spectacles which are adapted to be used and handled in exactly the same manner as ordinary spectacles. As the field of vision of the lenses increases when the curvature of the same decreases it is preferable to make the lenses of a material having the highest possible coefficient of refraction. For instance glass with a coefficient of refraction of the magnitude 1.8 may be used but also materials having higher or smaller coefficients of refraction may be used. Fig. 2 shows a convexo-concave lens 3 adapted to be used in spectacles according to the invention. Usually the plano-convex or the convexo-concave form of the lenses will be preferred because of their greater field of vision but also double convex lenses 4 as shown in Fig. 3 may be used.

Figs. 4–6 show lens systems incorporating air spaces which can be said to form a sort of lenses. In Fig. 4 an air space is formed between a plano-convex lens 5 and a plano-parallel plate 6 encircled by and suitably connected to a rim 7, and in Fig. 5 an air space is formed in similar manner between two curved plano-parallel plates 8 and 9.

Finally in Fig. 6 a double convex lens 10 is inserted between two plano-parallel plates 11 and 12. It will be estimated that the refracting capacity of this lens is considerably higher than that of a lens directly immersed in water and thus for a given material a greater field of view may be obtained than in the case of the constructions according to Figs. 1–3.

It will be evident that many other forms of lenses and lens systems than those described and shown may be employed and I also wish to point out that the lenses may be made from any other transparent material than those specified. Further the focus of the lenses or lens systems may vary within wide limits as the action of the same can be adjusted to a certain degree by placing them in a longer or shorter distance before the eyes. Finally the spectacles may be in the form of a monocle or otherwise provided with a lens or lens system for one eye only. It is to be understood that I wish to limit myself only to the scope of the appended claims.

Having now particularly described and ascertained the nature of my said invention and in what manner the same is to be performed, I declare that what I claim is:

1. A lens for under water use, including a plano-parallel body and a body of transparent material having a plano-surface and a convex surface protected from contact with water by the plano-parallel body of transparent material and by an enclosing rim which forms a plano-concave air lens between said two bodies of the same diameter as that of the convex surface of said first body.

2. A lens for under water use, composed of a plano-parallel body and a solid body of transparent material having a plano-surface and a convex surface protected from contact with water by the plano-parallel body of transparent material and by an enclosing rim surrounding both bodies and bridging them at their most widely separated points.

3. A lens structure composed of a plano-parallel body and a plano-convex body of transparent material with its convex surface arranged adjacent the plano-parallel body of transparent material in parallel relation to the plane surface of said first body, and a cylindrical rim engaging the peripheries of said bodies and forming an air space between them having the configuration of a plano-concave lens.

4. A lens for under water use composed of two plano-parallel bodies and a solid body of transparent material having oppositely disposed convex surfaces each protected from contact with water by one of the plano-parallel bodies of transparent material and by an enclosing cylindrical rim surrounding and joining the peripheries of all three bodies.

5. A lens structure for under water use composed of an enclosure having two outer plano-parallel bodies separated by a cylindrical rim surrounding and joining the peripheries of said parallel bodies and a double convex lens of transparent material each convex surface of which is protected by said enclosure which forms two air spaces having the configuration of a plano-concave lens.

JENS EINAR VANG GRANØ.